March 9, 1926.

W. NAYDA 1,575,704

CHEESE PRESS

Filed May 28, 1925 2 Sheets-Sheet 1

Inventor
W. Nayda

By Bryant & Lowry
Attorneys

March 9, 1926.
W. NAYDA
1,575,704
CHEESE PRESS
Filed May 28, 1925 — 2 Sheets-Sheet 2
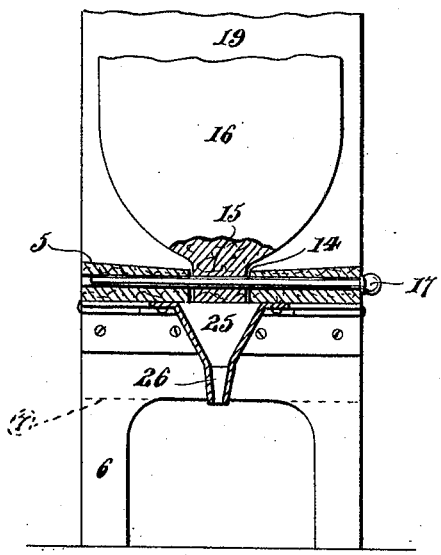
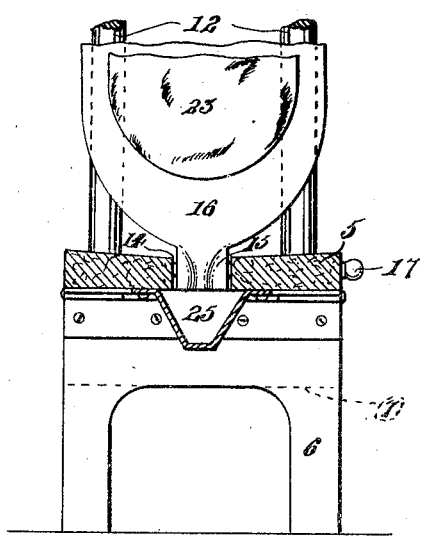
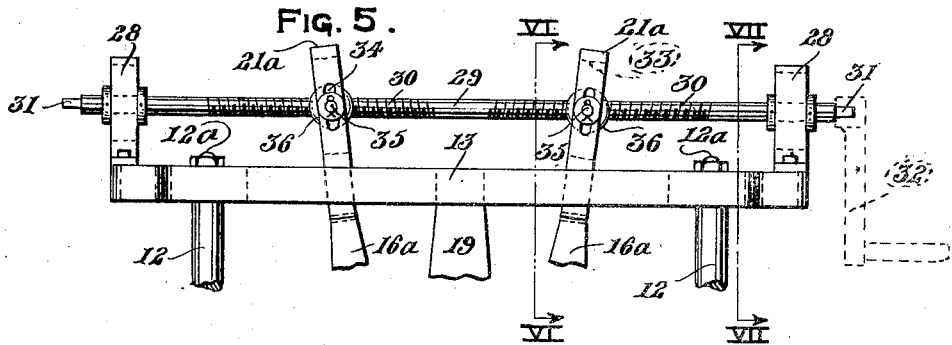
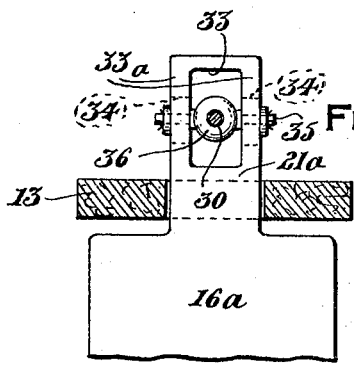
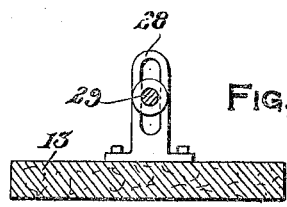
Inventor
W. Nayda
By Bryant & Lowry
Attorneys Patented Mar. 9, 1926.

1,575,704

UNITED STATES PATENT OFFICE.

WLADYSLAW NAYDA, OF WILMINGTON, DELAWARE.

CHEESE PRESS.

Application filed May 28, 1925. Serial No. 33,467.

*To all whom it may concern:*

Be it known that I, WLADYSLAW NAYDA, a citizen of Poland, residing at Wilmington, in the county of New Castle and State of Delaware, have invented certain new and useful Improvements in Cheese Presses, of which the following is a specification.

This invention relates to new and useful improvements in cheese presses.

The primary object of the invention is the provision of a press which may be used for extracting moisture from cheese, or the like.

A further object of the invention is the provision of a press of the above mentioned type which is of exceedingly simple and durable construction and one that will perform its intended function in a very efficient and expeditious manner.

Other objects and advantages of the invention will be apparent during the course of the following description.

Figure 1:
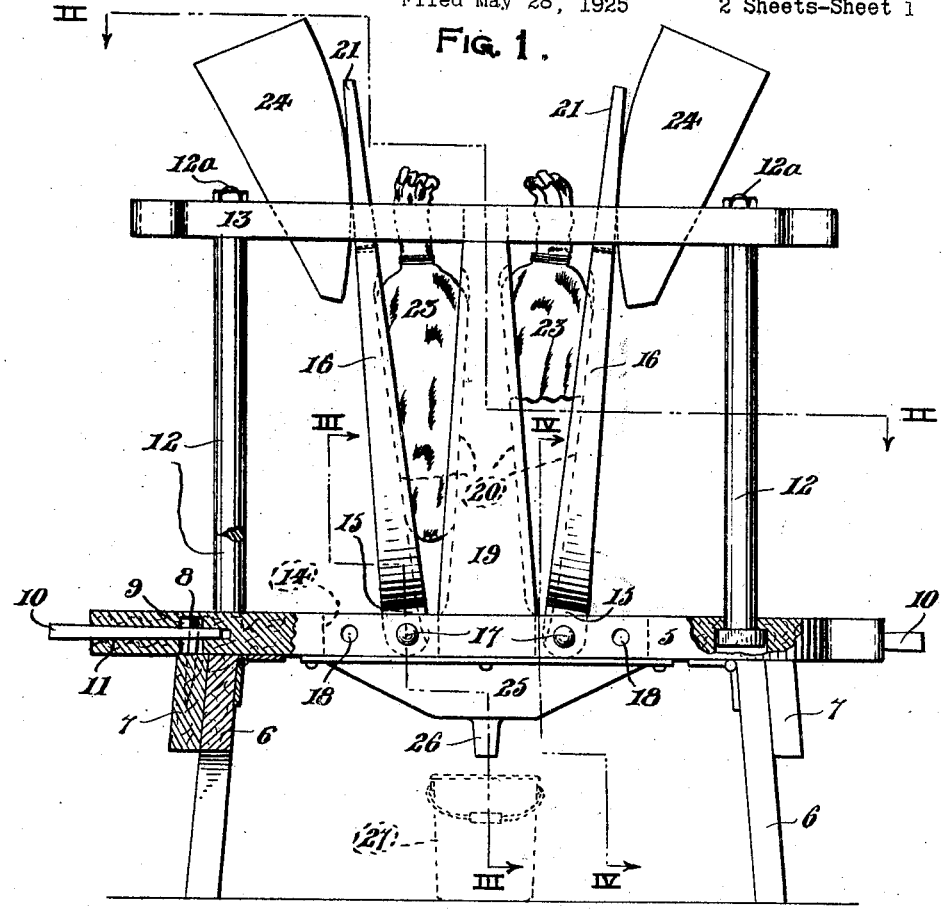
Figure 2:
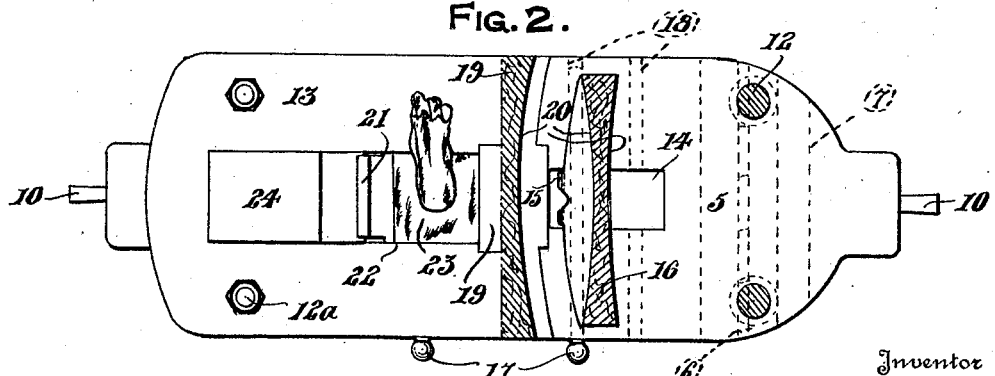

In the accompanying drawings forming a part of this specification and in which like numerals are employed to designate like parts throughout the same, Figure 1 is a side elevational view, partly broken away, of the cheese press embodying this invention, Figure 2 is a horizontal sectional view taken upon line II—II of Fig. 1, Figure 3 is a vertical sectional view taken upon line III—III of Fig. 1, Figure 4 is a vertical sectional view taken upon line IV—IV of Fig. 1, Figure 5 is a fragmentary view of a modified form of presser actuating means capable of being used in place of the presser member actuating wedges shown in Figs. 1 and 2, Figure 6 is a vertical sectional view taken upon line VI—VI of Fig. 5, and Figure 7 is a vertical sectional view taken upon line VII—VII of Fig. 5.

In the drawings, wherein for the purpose of illustration is shown the preferred embodiments of this invention, the numeral 5 designates the base plate of the cheese press embodying this invention which has hinged to the bottom face thereof the legs 6. These legs have connected to the outer faces of their upper ends the transverse blocks 7 each of which carries a staple, or the like, 8 projecting above its upper edge. One of these staples 8 is shown in Fig. 1 as being received within a notch 9 formed in the base plate 5 and entering the same from its lower face. It is to be understood when the legs 6 are arranged as shown in Figs. 1, 3 and 4, these staples 8 will reside within the notches 9 and will be retained therein by the pins 10 which enter the plate 5 through the longitudinally extending holes 11 entering the same from its opposite end. By withdrawing these pins 10, the legs 6 may be swung inwardly toward each other to engage the under face of the base plate 5.

Suitably connected to and extending perpendicularly from this base plate 5 are the standards 12 which have bolted to their upper reduced ends 12ª the top plate 13.

The base plate 5 is longitudinally slotted at 14 for receiving the reduced ends 15 of the movable presser members 16 which are adjustably held therein by means of the removable pins 17 which are intended to be positioned within the transverse openings 18 formed in the base plate. Extending perpendicularly between the base plate 5 and top plate 13 is a perpendicularly tapering, stationary presser member 19 which is connected at its opposite ends to these plates 5 and 13. By inspecting Figs. 1 and 2, it will be seen that the adjacent faces of the presser members 16—16—19 are concaved at 20 with the curvature of these surfaces extending transversely of these members. The upper ends of the movable, adjustable presser members 16 are reduced in transverse width, as at 21, for being received within the longitudinally extending slot 22 formed in the top plate 13 and for projecting above this plate.

In pressing cheese, or the like, with the form of press shown in Figs. 1 to 4 inclusive, the cheese is placed in bag containers 23 which are arranged within the spaces between the concaved faces 20 of the presser members 19 and 16 and the wedges 24 are driven into the opposite ends of the slot 22 outwardly of the perpendicularly projecting ends 21 of the movable presser members 16. This downward movement of the wedges 24 will force the presser members 16 toward the stationary presser member 19, due to the pivoting of the members 16 upon their fulcrum pins 17 for squeezing moisture from the cheese contained within the bags 23.

The concaved surfaces 20 of the presser members 16 and 19 are intended to direct this extracted moisture away from the edges of the member 16 and 19 so that the said moisture will gravitate toward the base plate 5 and will pass therethrough by way of the longitudinal slot 14. To collect this moisture and control the discharge of the same to a reduced area, the drip pan of funnel 25 is provided and is secured to the bottom face of the base plate 5. This drip pan or funnel 25 is provided with a discharge orifice 26 beneath which a pail or the like 27 may be placed for catching the moisture.

In Figs. 5 to 7 inclusive there is shown a modified form of movable presser member actuating means. The perpendicularly slotted bearing brackets 28 are bolted to the upper face of the top plate 13 and have rotatably mounted and vertically movably arranged within the slots of the same, the shaft 29, which is provided with the oppositely extending threaded portions 30, or in other words, the right and left hand threads 30. The opposite ends of this shaft 29 are squared at 31 for being engaged by the operating crank handle 32 by means of which the shaft 29 may be rotated in opposite directions.

The ends 21ª of the movable presser members 16ª are longitudinally slotted at 33 and have the side portions 33ª slotted at 34 for receiving the transverse pins 35 which extend laterally from the apertured blocks 36 which are internally screw threaded for engaging the threads 30 on the shaft 29.

It will now be seen that by rotating the shaft 29 in opposite directions, the blocks 36 will be fed toward and away from each other for causing movement of the presser members 16ª toward and away from the stationary presser member 19.

It is to be understood that the forms of this invention herewith shown and described are to be taken as preferred exampes of the same, and that various changes in the shape, size, and arrangement of parts may be resorted to without departing from the spirit of the invention or the scope of the subjoined claim.

Having thus described the invention, I claim:—

In a press of the type described, a base, a top plate spaced from the base and said base and top plate having vertically alined openings therein at opposite sides of the centers thereof, a stationary wedge-shaped presser member centrally positioned between the base and top plate, movable presser members having their lower ends adjustably pivoted in the base slots with the reduced upper end extending freely through the adjacent slot in the top plate and manually operable means associated with the upper end of each movable presser member above the top plate for moving the presser members toward the stationary presser member.

In testimony whereof I affix my signature.

WLADYSLAW NAYDA.